United States Patent [19]

Curtis

[11] 3,998,144
[45] Dec. 21, 1976

[54] COFFEE URN

[75] Inventor: Robert A. Curtis, Encino, Calif.

[73] Assignee: Wilbur Curtis Co., Inc., Los Angeles, Calif.

[22] Filed: July 29, 1975

[21] Appl. No.: 600,002

[52] U.S. Cl. .................................. 99/293; 99/300
[51] Int. Cl.² ........................................ A47J 31/00
[58] Field of Search ........... 99/293, 279, 287, 288, 99/291, 294, 299, 300, 302, 303, 316; 126/369, 381; 426/506

[56] References Cited

UNITED STATES PATENTS

| 1,235,791 | 8/1917 | Gebhardt et al. | 99/293 |
|---|---|---|---|
| 2,066,807 | 1/1937 | Snelling | 99/293 |
| 2,858,762 | 11/1958 | Wade | 99/287 |
| 3,085,880 | 4/1963 | Matty | 99/287 X |
| 3,128,691 | 4/1964 | Carrillo | 99/293 |
| 3,517,603 | 6/1970 | Bruenjes et al. | 99/291 X |
| 3,650,201 | 3/1972 | Jovanovic | 99/279 |

Primary Examiner—Leonard D. Christian
Assistant Examiner—Arthur O. Henderson
Attorney, Agent, or Firm—Albert L. Gabriel

[57] ABSTRACT

A coffee making apparatus is disclosed for automatically mixing instant coffee and for maintaining the coffee hot during dispensing thereof. The coffee is housed within an urn similar to that utilized for drip coffee although simpler in construction and designed specifically for instant or freeze-dried applications. Provisions are also made for dispensing hot water.

22 Claims, 7 Drawing Figures

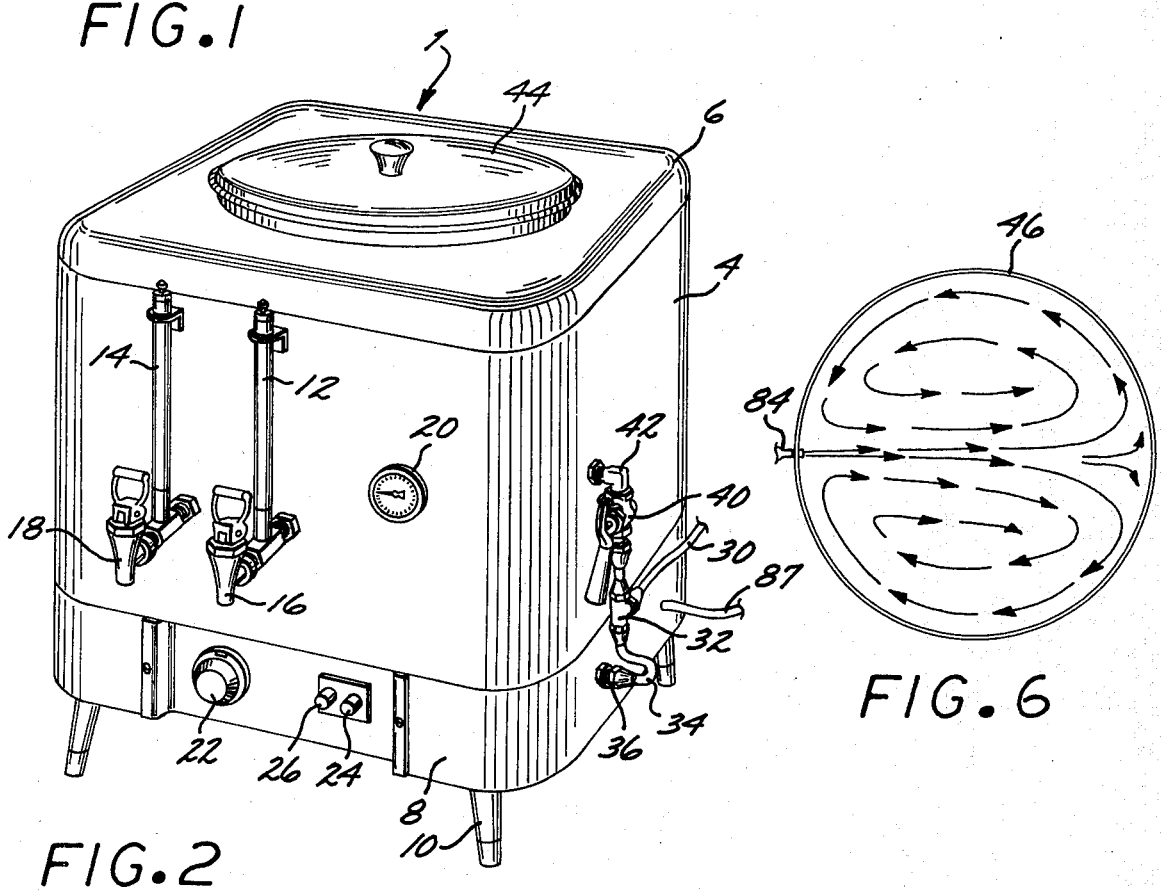
FIG. 1
FIG. 6
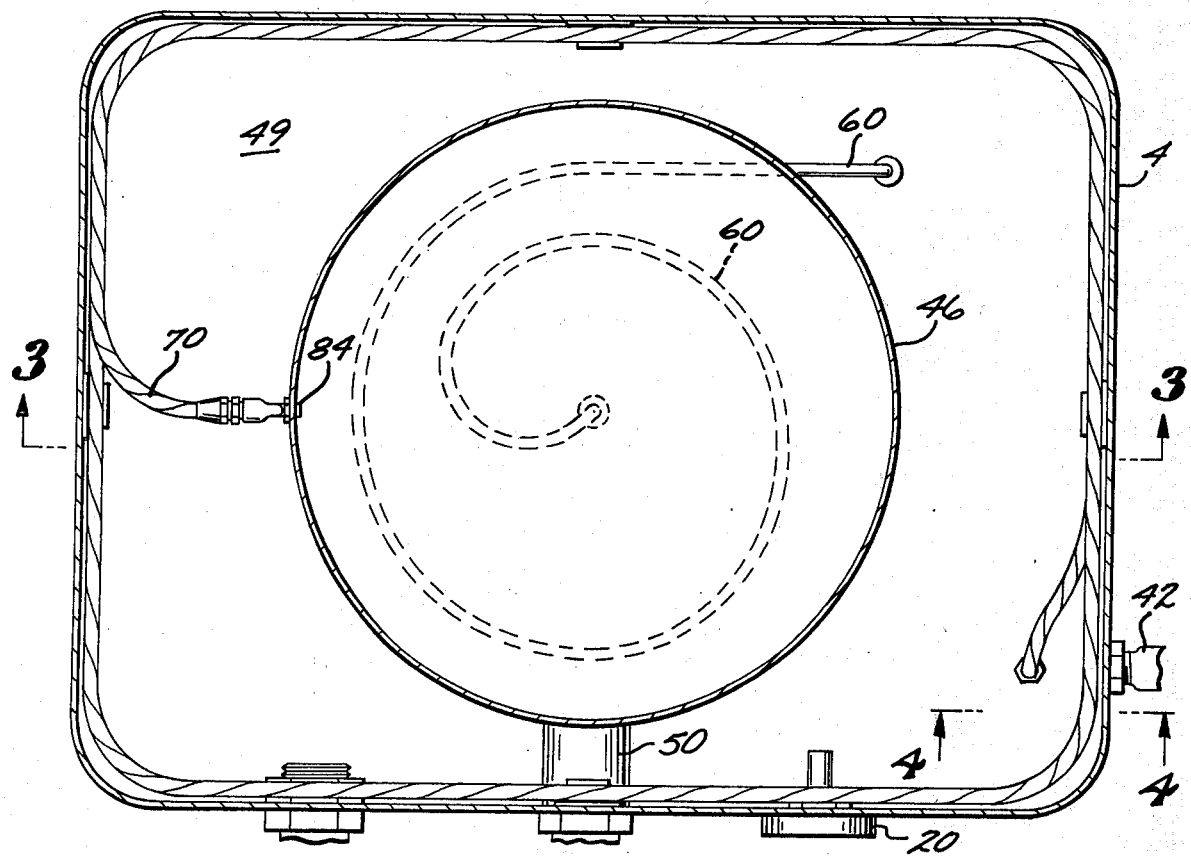
FIG. 2

COFFEE URN

BACKGROUND OF THE INVENTION

1. Field of the Invention

The invention is in the field of coffee makers and is particularly directed toward coffee mixers for use with freeze-dried or instant coffees.

2. Description of the Prior Art

Coffee urns have long been utilized for making and dispensing drip coffee for large numbers of users and in many commercial environments. In commonly known "drip-type" urns, coffee grounds are placed in a retaining basket positioned above the coffee collecting and dispensing means, and hot water is dispensed from a spray head located above the basket, the hot water dripping down through the coffee grounds from which it extracts flavor ingredients to become brewed coffee which is filtered as it leaves the basket and is then stored for use. The brewed coffee is maintained at a high temperature during storage and dispensing thereof.

In utilizing instant or freeze-dried coffee mixes it is not necessary to cause the hot water to flow down through a granular body of coffee, nor is it required to filter the brewed coffee. Indeed, the popularlity of instant or freeze-dried coffee rests upon its simplicity of preparation in that one only needs to add hot water to the coffee and mix the coffee therein.

Heretofore, the prime utilization of instant and freeze-dried coffees was limited to the making of small quantities of such coffee, as for example a single cup at a time as an individual required. Instant coffee has not been utilized in large commercial dispensers, and prior art drip-type coffee urns are not designed to operate on instant coffees. In particular, if an attempt were made to utilize a conventional drip-type coffee urn to make instant or freeze-dried coffee, the feeding of hot water from the conventional spray head apparatus located above the urn to the top of the urn would not provide the necessary mixing of the instant or freeze-dried coffee, and bulky and undesirably complicated mechanical mixers would have to be employed. The design of an instant coffee urn for commercial use has been further hampered by a general reluctance of consumers to order instant coffee as compared with drip coffee. Instant coffees are generally considered less "desirable" than true drip-type coffees and thus, despite the relative ease of making instant coffees, there has been a psychological customer block against them.

SUMMARY OF THE INVENTION

It is therefore an object of the present invention to provide a coffee urn for mixing and dispensing intant coffees and freeze-dried coffees.

A further object of the invention is to provide a coffee urn which, although designed specifically for instant and freeze-dried coffee mixing, nevertheless resembles a fresh brew type coffee urn.

It is a further object of the invention to provide a simple construction for an instant or freeze-dried coffee urn in which hot water entering the coffee container will automatically mix the coffee therein so that separate mechanical agitation need not be utilized.

A further object of the invention is to provide a coffee urn wherein dispersion and mixing of hot water and coffee ingredients is effected without the need for spray head equipment located above the urn.

A further object of the invention is to provide a combined instant or freeze-dried coffee urn and hot water dispenser.

Yet another object of the invention is to provide a coffee urn wherein hot water is maintained both for dispensing as such and for heating a separate container of instant coffee.

Yet another object of the invention is to provide an instant coffee urn wherein water supplied to the coffee container is automatically heated in a hot water reservoir by passing through a coiled twisted conduit before passing into the coffee container.

Yet a further object of the invention is to provide a coffee urn which is easy to construct, operate and maintain.

The coffee urn of the instant invention comprises a housing having a wall and a bottom portion and having a coffee container therein. The coffee container is spaced from the inside of the housing wall to define a reservoir which is filled with liquid and maintained at a high temperature. The outer wall of the housing resembles a conventional drip-type coffee maker/dispenser and may support gauge glasses and spigots. The instant or freeze-dried coffee is placed in the coffee container and a stream of hot water is sprayed against the coffee adjacent the bottom portion of the container so as to thoroughly mix the instant coffee and simultaneously fill the container with hot water. The coffee container is maintained hot by the hot water reservoir which itself is heated. A twisted coil conduit is provided within the heated reservoir to feed the coffee container with water and a nozzle connected to the conduit and positioned adjacent the bottom of the coffee container provides a powerful water spray to achieve the necessary agitation and filling.

BRIEF DESCRIPTION OF THE DRAWINGS

These and other objects of the instant invention will become clear from the detailed description set forth hereinafter taken in conjunction with the drawings wherein:

FIG. 1 is a perspective view of the coffee urn;

FIG. 2 is a fragmentary horizontal-sectional view of the coffee urn taken near the top of the casing thereof;

FIG. 6 is a flow diagram of the coffee/water mixture from the spray nozzle in the coffee container.

DETAILED DESCRIPTION OF THE PREFERRED EMBODIMENTS

Figure 3:
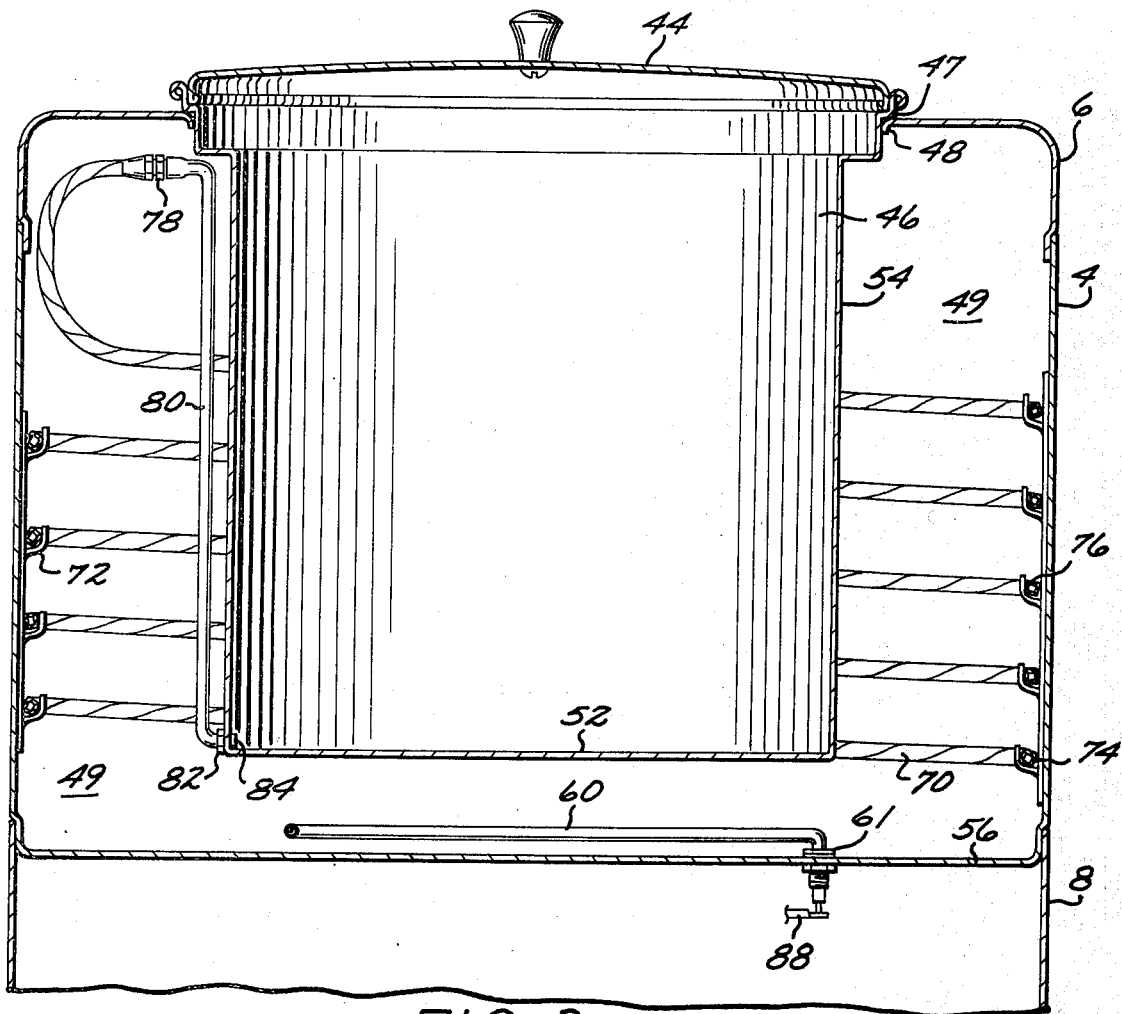
FIG. 3 is a fragmentary vertical-sectional view of the coffee urn taken along lines 3—3 of FIG. 2.

FIG. 1 shows a perspective view of the coffee urn according to the invention. The coffee urn 1 comprises a housing 4 having a top casing 6 and a bottom casing 8. Support legs 10 are mounted to the bottom casing 8 for supporting the urn 1. Attached to the housing 4 are gauge glasses 12 and 14 together with respective spigots 16 and 18. Such spigots and gauge glasses are of conventional design and are widely utilized in drip-type coffee urns. Also attached to the housing 4 is a temperature gauge 20 of conventional design.

The bottom casing 8 of the urn 1 contains operating controls and comprises a temperature control dial 22 for adjusting the temperature of the coffee and hot water, and a pair of timer control buttons 24 and 26. Timer control button 24 is the "start" timer control button whereas button 26 is the "reset" timer control button.

The coffee urn shown in FIG. 1 may supply both hot coffee and hot water, the coffee being dispensed from spigot 16 whereas the hot water is dispensed by a spigot 18. Water is fed into the urn 1 by means of a pipe 30 which is connected to a T fitting 32. The water path is divided at the T fitting 32 and a portion thereof passes through a pipe 34 to a connector 36. A second portion of the water flow passes to a self-closing handle valve 40 and subsequently to an elbow fitting 42. Elbow fitting 42 communicates directly to the interior of housing 4 whereas connector 36 is fed to further valve control means as explained further below.

A lid 44 is provided adjacent the top casing 6 and is utilized to cover a coffee container or liner 46. As shown most clearly in FIG. 3, coffee container 46 is supported by means of an outwardly extending lip portion 47 which rests against an annular shoulder 48 of top casing 6. The coffee container 46 is thus supported within the housing 4, and the spacing between the coffee container 46 and housing 4 defines a reservoir 49. As seen in FIG. 2, the interior of coffee container 46 is in communication with coffee spigot 16 by means of a tube 50 passing through reservoir 49. Container 46 has a bottom 52 and wall portion 54 which provide a fixed volume for production of coffee and may be conveniently made to hold 4 or 8 gallons. A heating element 60 is provided to heat a liquid such as water in reservoir 49. The heating element 60 is of the submersible type and is connected to electrical power means through the housing bottom 56 by means of connector 61.

Figure 4:
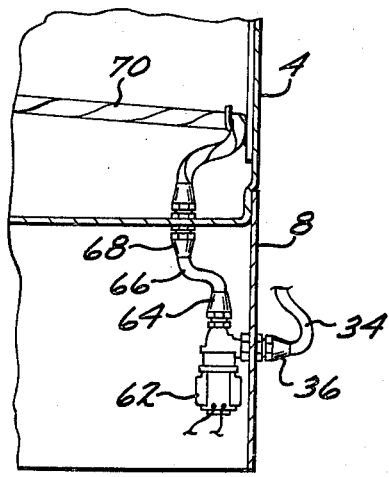
FIG. 4 is a fragmentary vertical-sectional view of the coffee urn taken along lines 4—4 of FIG. 2.

Water enters the reservoir 49 by way of the self-closing handle valve 40 and elbow fitting 42. Water enters the coffee container 46 by means of the pipe 34 and connector 36. As best illustrated in FIG. 4, connector 36 is coupled to a solenoid valve 62 which in turn is coupled to connector 64 and passes water from pipe 34 to a pipe 66. Pipe 66 is coupled by means of connector 68 to a conduit 70. If desired, a check valve, such as a double ball check valve, may be included in pipe 66 or as a part of connector 68, to prevent coffee from container 46 from backing up into the water line upon loss of water pressure in the line. Supporting conduit 70 on the inner surface of housing 4 is a plurality of brackets 72. Conduit 70 spirals around the inner surface of housing 4 and is perferably of square or other irregular cross section and twisted to expose more surface area to the reservoir 49. The conduit 70 may be seen in various twisted positions as shown by cross-sectional portions labeled 74 and 76 in FIG. 3. Water passing through conduit 70 is fed via connector 78 to the upper end of an up-standing pipe 80 which is connected at its lower end to a connector 82 and nozzle 84. The nozzle 84 passes through an aperture in the wall portion 54 of coffee container 46 and is preferably spaced approximately one-eighth to one-quarter inch above the bottom 52 of container 46. As shown in FIG. 6, water ejected from nozzle 84 agitates the coffee within container 46 and thoroughly mixes the instant coffee while simultaneously filling the coffee container 46. The pressure within the conduit 70 coupled with the small orifice in nozzle 84 serves to force the water at high speed across the bottom 52 of container 46 and thus thoroughly intermixes the coffee and water. Freeze-dried coffee may be provided as a preformed "package" that is placed on the bottom 52 of the container 46 before the flow of hot water is initiated through nozzle 84. When the flow through nozzle 84 commences, the impact of the high-speed jet of hot water against the bottom portion of the freeze-dried package causes the package to rapidly break up.

Figure 5:
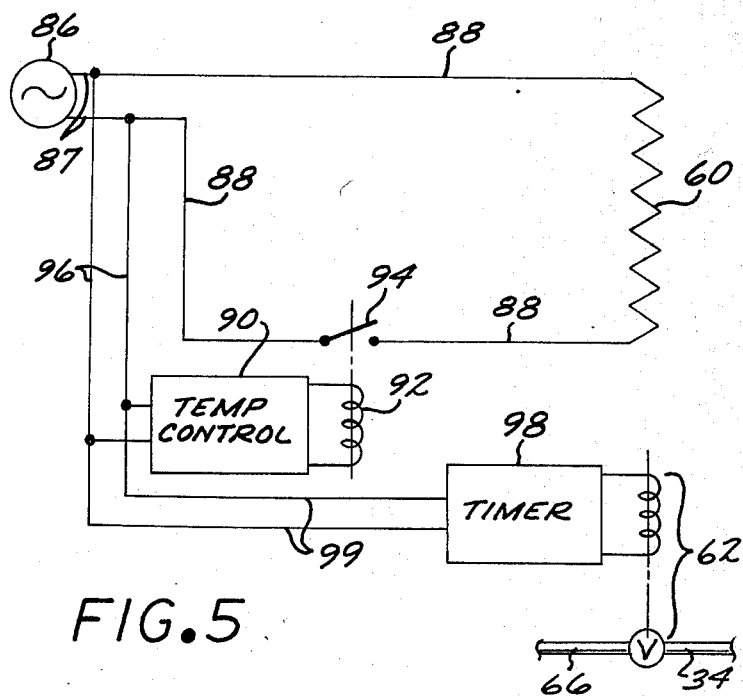
FIG. 5 is a schematic diagram of the heating and timer elements of the coffee urn.

A schematic illustration of the circuit diagram for the coffee urn is shown in FIG. 5. A power source 86, as for example supplied from a conventional AC electrical outlet, is utilized to feed current through conductors 87 and 88 to the heating element 60. A temperature control unit 90 is provided together with a solenoid 92 and switch 94 to open and close the heating element circuit as required to maintain the predetermined temperature as provided by the operator on temperature control dial 22 (See FIG. 1). The temperature control unit 90 is supplied with current by means of conductors 87 and 96.

Also illustrated in FIG. 5 is a timer 98 which is connected to the power source 86 by means of conductors 87, 96 and 99. Timer 98 is provided to actuate the solenoid valve 62 which is positioned between pipe 34 and pipe 66. The start timer control button 24 is utilized to actuate the solenoid valve 62 to an open position thereby passing water from pipe 34 to pipe 66. After a predetermined time interval from the actuation of timer control button 24 to initiate a brewing cycle the timer 98 closes solenoid valve 62 thereby blocking further fluid flow. The reset timer control button 26 is utilized to reset timer 98 to a new cycle subsequent to refilling the coffee urn for preparing a new batch of coffee.

In operation the coffee urn 1 is first connected to the power source 86 by connecting the conductors 87 to a conventional AC outlet. Self-closing handle valve 40 is then manually opened to allow water to enter the reservoir 49 via the pipe 30, self-closing handle valve 40 and elbow fitting 42. The level of water within the reservoir 49 may be visually observed by means of the gauge glass 14. The temperature control dial 22 is set so that the heating element 60 is turned on to maintain water in reservoir 49 at the desired temperature. The temperature gauge 20 is provided to maintain a check on the actual temperature within reservoir 49. After reservoir 49 has been filled to the desired amount the operator releases the self-closing handle valve 40 which automtically terminates further filling of reservoir 49. The lid 44 of coffee urn 1 is removed and a predetermined amount of freeze-dried or instant coffee is deposited on the bottom 52 of the coffee container 46, as for example in a preformed freeze-dried package. Lid 44 is then repositioned on container 46. The operator then depresses the start timer control button 24 which activates the timer 98 to open solenoid valve 62 for a predetermined length of time. In practice, the fluid flow rate may be approximately one gallon per minute and thus, in a four-gallon coffee container 46 the timer 98 will be set for the predetermined time of 4 minutes. Of course, longer time periods would be provided for a larger coffee container or optionally, a smaller time may be provided if a lesser amount of coffee is desired to be made.

The water entering through pipe 30 and pipe 34 is generally cold water and thus the water must be heated before entering the coffee container 46. To this end, the conduit 70 is both twisted and made in a spiral as described above and illustrated in FIGS. 2 and 3. The spiral configuration permits a long tubing to be utilized; for example, the conduit 70 may be some 30 feet long. The twisting of the conduit provides additional surface area to the reservoir 49 and thus increases the rate of heat absorption to the water passing through conduit 70. Conduit 70 may comprise, for example, a one-half inch square copper tubing. The water leaving conduit 70 and passing to the pipe 80 is therefore at a high temperature which is generally slightly below the boiling point of water. The water is then passed through nozzle 84 where it is projected at a high velocity into the coffee container 46. The nozzle itself is positioned slightly above the bottom 52 of coffee container 46 so that the jet stream of hot water impacts directly against the instant or freeze-dried coffee resting thereon. As the coffee container 46 begins to fill, the swirling action set up by the water emanating from nozzle 84 creates a pattern similar to that shown in FIG. 6. The agitation of the water thoroughly intermixes the water with the instant or freeze-dried coffee. Inasmuch as instant or freeze-dried coffee is heavier than water, any particles not thoroughly mixed with water will fall toward the bottom 52 of coffee container 46 during the filling thereof. Consequently, such unmixed portions will again be thoroughly agitated by the hot water emanating from nozzle 84 and thus a total thorough intermixing of all of the coffee is assured.

At the end of the predetermined time interval, the timer 98 automatically shuts off the further flow of hot water into coffee container 46 and the hot coffee is now ready for dispensing through spigot 96 in a conventional manner. Glass gauge 12 provides a visual observation of the quantity of brewed coffee contained in coffee container 46, and thus the operator has a visual observation of both the coffee level in container 46 and the water level in reservoir 49. Additional water may be fed into reservoir 49 at any time by the operator by merely opening the self-closing handle valve 40.

Figure 7:
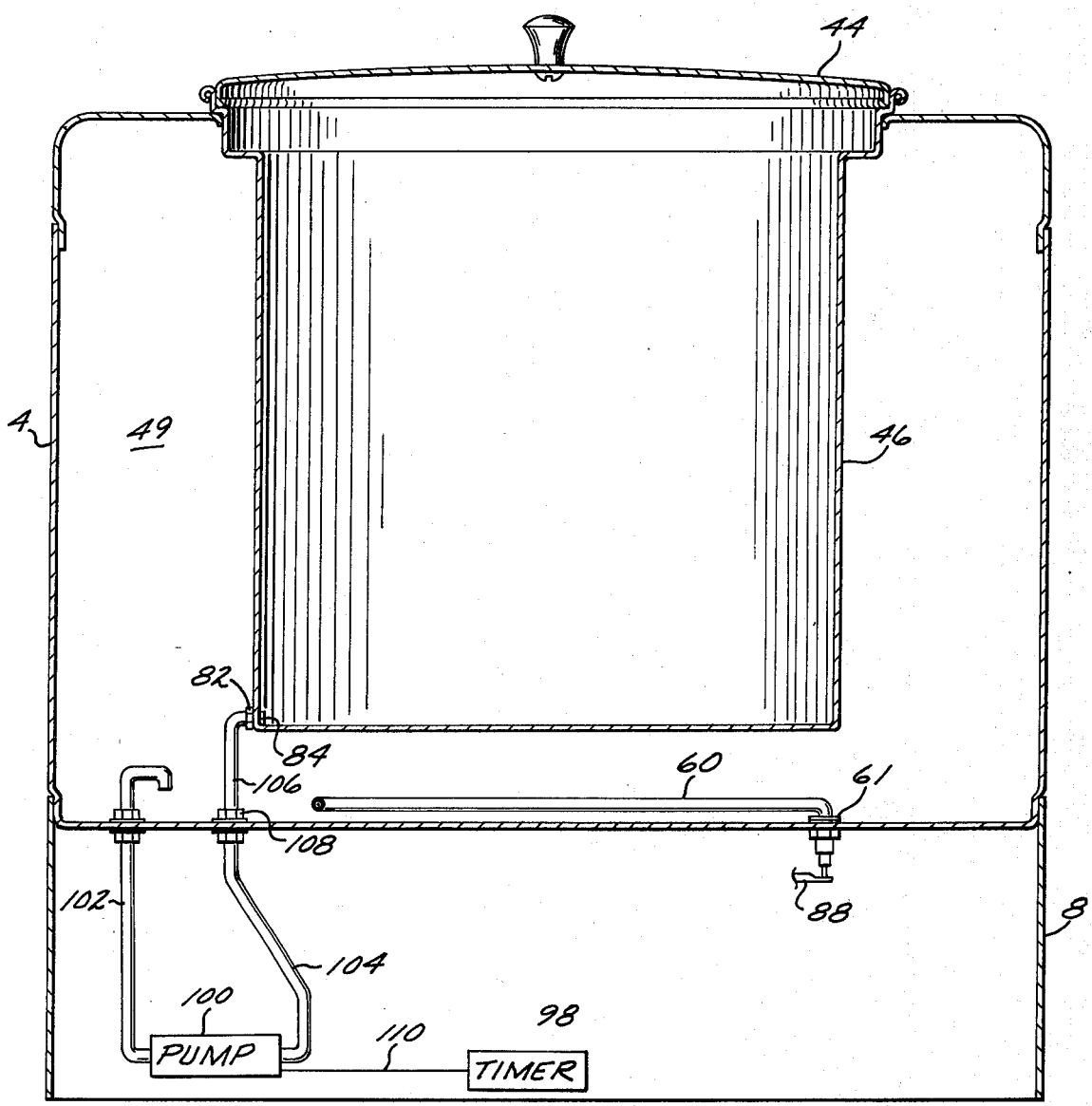
FIG. 7 is a fragmentary vertical-sectional view similar to that of FIG. 3 but showing another embodiment of the coffee urn.

An alternative embodiment of the invention may be provided wherein the solenoid valve and twisted conduit 70 are removed and hot water is pumped from the reservoir 49 directly to the nozzle 84. Such an embodiment is illustrated in FIG. 7, wherein a pump 100 is provided having an inlet pipe 102 in communication with the reservoir 49 and an outlet pipe 104 connected to a feed pipe 106 via a connector 108. Feed pipe 106 is in turn connected to the nozzle 84 as in the embodiment of FIG. 3. In the embodiment shown in FIG. 7, the timer 98 is connected to pump 100 by conductor means 110 in order to turn on the pump only during the predetermined time interval. When the pump 100 is turned off, no water is fed through the outlet pipe 104 into the coffee container 46 and thus the filling process is terminated.

While the invention has been described with reference to the above disclosure relating to the preferred embodiments, it is understood that numerous modifications or alterations may be made by those skilled in the art without departing from the scope and spirit of the invention as set forth in the claims.

I claim:
1. A coffee urn for preparing instant coffee beverage comprising:
 a. a housing having a continuous wall and a bottom,
 b. a container for coffee beverage positioned substantially in said housing and spaced from said housing wall thereby defining a liquid reservoir between said housing wall and said container,
 c. means for filling said reservoir with liquid,
 d. means for heating said reservoir liquid,
 e. lid means removable from said container to allow access to the interior of said container for depositing instant coffee at the bottom thereof,
 f. means for forcing heated water into said container proximate the bottom thereof, thereby agitating said water to mix said instant coffee with said water,
 g. said heated reservoir liquid maintaining said coffee beverage hot within said container, and
 h. means for dispensing said coffee beverage.

2. A coffee urn as recited in claim 1, wherein said urn further comprises means for dispensing said reservoir liquid.

3. A coffee urn as recited in claim 2 wherein said reservoir liquid is water.

4. A coffee urn as recited in claim 3 wherein said reservoir liquid dispensing means comprises a manually controllable spigot.

5. A coffee urn as recited in claim 4 wherein said coffee beverage dispensing means comprises a manually controllable spigot.

6. A coffee urn as recited in claim 1 wherein said urn further comprises means for heating said heated water.

7. A coffee urn as recited in claim 6 wherein said means for heating said heated water comprises conduit means positioned within said reservoir in thermal communication with said heated reservoir liquid, said heated water passing through said conduit and heated by said heated reservoir liquid.

8. A coffee urn as recited in claim 7 wherein said conduit is spirally formed within said reservoir.

9. A coffee urn as recited in claim 8 wherein said spirally formed conduit is twisted.

10. A coffee urn as recited in claim 9 wherein said forcing means comprises a nozzle positioned proximate the bottom of said container for receiving heated water from said conduit.

11. A coffee urn as recited in claim 8 wherein said urn comprises valve means for connecting said conduit to a pressure water pipe.

12. A coffee urn as recited in claim 11 wherein said urn comprises timing means for opening said valve means for a predetermined time interval to permit substantial filling of said container.

13. A coffee urn as recited in claim 12 wherein said urn comprises means for regulating the temperature of said reservoir liquid.

14. A coffee urn as recited in claim 6 wherein said means for heating said heated water is said means for heating said reservoir liquid and said reservoir liquid is forced into said container.

15. A coffee urn as recited in claim 14 wherein said means for forcing heated water into said container comprises pump means.

16. A coffee urn as recited in claim 15 wherein said urn comprises timing means for actuating said pump means for a predetermined time interval.

17. A coffee urn as recited in claim 16 wherein said urn comprises means for regulating the temperature of said reservoir fluid.

18. A coffee urn as recited in claim 1 wherein said housing is cylindrical.

19. A coffee urn as recited in claim 18 wherein said container is cylindrical.

20. A coffee urn as recited in claim 19 wherein said means for heating said heated fluid comprises conduit means positioned within said housing in thermal communication with said heated reservoir liquid, said heated water passing through said conduit and being heated by said heated reservoir fluid.

21. A coffee urn as recited in claim 20 wherein said conduit is spirally formed around said container.

22. A coffee urn as recited in claim 21 wherein said conduit is of a substantially square cross-sectional area and is twisted.

* * * * *